United States Patent
Nania (10) Patent No.: US 9,902,239 B2
(45) Date of Patent: Feb. 27, 2018

(54) SUN VISOR SYSTEM FOR A MOTOR VEHICLE

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/918,045

(22) Filed: Oct. 20, 2015

(65) Prior Publication Data

US 2017/0106728 A1    Apr. 20, 2017

(51) Int. Cl.
*B60J 3/02*    (2006.01)

(52) U.S. Cl.
CPC .................................. *B60J 3/0243* (2013.01)

(58) Field of Classification Search
CPC .............................. B60J 3/0243; B60J 3/0234
USPC ....... 296/97.4, 97.7, 97.11, 97.8; 160/DIG. 3
See application file for complete search history.

(56) References Cited

U.S. PATENT DOCUMENTS

| | | | | |
|---|---|---|---|---|
| 3,343,868 A * | 9/1967 | Manookian, Jr. | ...... | B60J 3/0204 296/97.4 |
| 4,558,899 A * | 12/1985 | Chu | ....... | B60J 3/0204 160/DIG. 3 |
| 4,874,938 A | 10/1989 | Chuang | | |
| 4,979,775 A * | 12/1990 | Klose | ....... | B60J 1/205 160/171 |
| 5,298,732 A | 3/1994 | Chen | | |
| 6,666,493 B1 | 12/2003 | Naik | | |
| 6,682,122 B1 | 1/2004 | Prokhorov | | |
| 7,140,663 B1 * | 11/2006 | Thacker | ..... | B60J 3/02 160/DIG. 3 |
| 7,216,917 B2 * | 5/2007 | Tadakamalla | ..... | B60J 1/2016 296/97.11 |
| 7,252,321 B2 * | 8/2007 | Lee | ........ | B60J 1/2025 160/370.22 |
| 2002/0060469 A1 * | 5/2002 | Schlecht | ..... | B60J 1/2027 296/97.4 |

(Continued)

FOREIGN PATENT DOCUMENTS

JP    2002362156 A    12/2002
JP    2003112524 A    4/2003

(Continued)

OTHER PUBLICATIONS

English machine translation of JP2002362156A.

(Continued)

*Primary Examiner* — Jason S Morrow
(74) *Attorney, Agent, or Firm* — Vichit Chea; King & Schickli, PLLC (57) ABSTRACT

A sun visor system is provided for a motor vehicle. That sun visor system includes a first guide track carried on an A-pillar and a second guide track carried on the rearview mirror support. A retractable sun visor panel has a first end received in the first guide track and a second end received in the second guide track. The retractable sun visor panel is displaceable between a stowed position and a fully-deployed position wherein it provides protection from the sun's glare across the entire width of the windshield between the A-pillar and the rearview mirror support.

16 Claims, 8 Drawing Sheets

(56) References Cited

U.S. PATENT DOCUMENTS

| | | | | |
|---|---|---|---|---|
| 2004/0155489 A1* | 8/2004 | Kawasaki | ............. | B60J 3/0204 |
| | | | | 296/214 |
| 2005/0236863 A1* | 10/2005 | Lee | ........................ | B60J 1/2025 |
| | | | | 296/97.4 |
| 2005/0264021 A1* | 12/2005 | Suzuki | ................... | B60J 3/0204 |
| | | | | 296/97.4 |
| 2005/0264022 A1* | 12/2005 | Suzuki | ................... | B60J 3/0204 |
| | | | | 296/97.4 |
| 2009/0134656 A1* | 5/2009 | Mori | ..................... | B60J 7/0015 |
| | | | | 296/97.4 |
| 2010/0276962 A1 | 11/2010 | Zhang et al. | | |
| 2011/0098894 A1 | 4/2011 | Zeng et al. | | |
| 2013/0141578 A1 | 6/2013 | Chundrlik, Jr. et al. | | |

FOREIGN PATENT DOCUMENTS

| | | | |
|---|---|---|---|
| JP | 2007112300 A | 5/2007 | |
| KR | 20110063981 A | 6/2011 | |
| KR | 2012072141 A | 7/2012 | |
| WO | 2015045692 A1 | 4/2015 | |

OTHER PUBLICATIONS

English machine translation of JP2003112524A.
English machine translation of JP2007112300A.
English machine translation of KR20110063981A.
English machine translation of KR2012072141A.
"Automatic Sunvisor System"; The Automatic Sunvisor System Group; http://www.me.berkeley.edu/ME102B/Past_Proj/f05/05/index.html; Jul. 16, 2015; pp. 1-2.

\* cited by examiner

SUN VISOR SYSTEM FOR A MOTOR VEHICLE

TECHNICAL FIELD

This document relates generally to the motor vehicle equipment field and, more particularly, to a sun visor system for a motor vehicle

BACKGROUND

It has long been known to equip a motor vehicle with sun visors to shade the eyes of the driver and front seat passenger from the glare of the sun coming through the windshield or window of a motor vehicle. Many motor vehicles include sun visors that are pivotally mounted on individual stalks and manually pivoted on the stalks between a stowed position adjacent the motor vehicle headliner and one or more operating positions covering an upper portion of the windshield or side window. Unfortunately, such manually-operated sun visors may become a distraction to the driver, who must remove a hand from the steering wheel in order to manipulate the sun visor into the desired position. This typically takes place when the driver has already been blinded by the glare of the sun. Further, it should also be appreciated that a typical sun visor does not cover the full area of the windshield between the A-pillar at the side of the vehicle and the rearview mirror support at the center of the vehicle, leaving gaps at both ends through which the sun's glare may reach the eyes of the driver or passenger.

Recognizing these shortcomings, some visor systems have been developed with computer controllers, so as to avoid the need for manual deployment of the sun visor. As illustrated in U.S. Pat. No. 6,682,122 (assigned to Ford Global Technologies, LLC), such systems may also include insert visors 14 that may be deployed laterally to reduce the gap between the ends of the primary visor and (a) the A-pillar and (b) the rearview mirror support. While useful, such systems require that the sun visor panels be made thicker in order to accommodate the insert visors and their drive gear. Further, the visor panels are also heavier. The added bulk of such sun visors makes them difficult to aesthetically stow in most motor vehicles, which inherently have limited headroom, and the added weight can adversely affect the service life of associated components such as hinges.

This document relates to a new and improved sun visor system that is compact and lightweight, that is particularly convenient to utilize and that will efficiently and effectively operate over a long service life. Further, the sun visor system disclosed in this document provides protection from the sun's glare across the entire width of the windshield between the A-pillar and the rearview mirror support without any gaps that might allow the sun's glare to reach the eyes of the driver or front seat passenger. As such, the sun visor assembly set forth herein represents a significant advance in the art.

SUMMARY

In accordance with the purposes and benefits described herein, a sun visor system is provided for a motor vehicle. That sun visor system comprises a first guide track carried on an A-pillar, a second guide track carried on a rearview mirror support and a retractable sun visor panel. The retractable sun visor panel includes a first end received in the first guide track and a second end received in the second guide track so that the sun visor panel extends completely across the windshield between the A-pillar and the rearview mirror support without any gaps. Further, the retractable sun visor panel is freely displaceable between a stowed position and a fully deployed position.

The sun visor system also includes a controller as well as a drive system responsive to the control to displace the retractable sun visor panel between the stowed position and the fully deployed position. That drive system may include a motor and a linkage between the motor and the retractable sun visor panel.

In one possible embodiment, the linkage includes a first cable connected to the first end of the retractable sun visor panel and a second cable connected to the second end of the retractable sun visor panel. Further, a first tube may be provided extending between the motor and the first guide track. The first tube receives the first cable. In addition, the sun visor system may include a second tube extending between the motor and the second guide track. The second tube receives the second cable.

In one possible embodiment, the controller is configured to receive data from a seat occupancy sensor indicating the presence of an individual in a seat of the motor vehicle associated with the retractable sun visor panel. That seat occupancy sensor may be an airbag sensor of the motor vehicle. In addition, the controller may be configured to receive data from a monitor for detecting sunlight on the face of an occupant of the seat. That monitor may be, for example, a digital camera.

Still further, the controller may be configured to receive data from a sun detection sensor for indicating ambient sunlight and activating the sun visor system when the sunlight level exceeds a predetermined threshold.

In one possible embodiment, the retractable sun visor panel comprises a flexible sheet of material wound on a roll. A spring may be provided for biasing the roll and drawing the retractable sun visor panel toward the stowed position. Further, an activation switch may be provided for activating and deactivating the sun visor system as desired by the operator.

In accordance with still another aspect, a sun visor system is provided for a motor vehicle, comprising the retractable sun visor panel, the controller, a drive system responsive to the controller and a seat occupancy sensor. The drive system functions to displace the retractable sun visor panel between a stowed position and a deployed position. The seat occupancy sensor is provided to indicate the presence of an individual in a seat of the motor vehicle associated with the retractable sun visor panel.

The sun visor system may further include a monitor for detecting sunlight on the face of an occupant of the seat. The controller is configured to be responsive to the monitor and adjust an operation position of the retractable sun visor panel so as to maintain a sun-visor-panel-cast shadow on or below the eyes of the operator. In one possible embodiment, the monitor utilizes a camera.

Further, the controller may be configured to receive data from a sun detection sensor for indicating ambient sunlight and activating the sun visor system if the sunlight levels exceed a predetermined threshold.

In accordance with yet another aspect, a method is provided for providing sun visor coverage for the windshield of a motor vehicle. That method may be broadly described as comprising the steps of providing a first guide track on an A-pillar of the motor vehicle, providing a second guide track on a rearview mirror support secured to the windshield of the motor vehicle and providing a retractable sun visor panel extending between the first guide track and the second guide track. That method may further include monitoring a face of the motor vehicle seat occupant and displacing the retractable sun visor panel between a stowed position and a fully deployed position so as to maintain a sun-visor-panel-cast shadow on or below the eyes of the seat occupant.

Still further, the method includes the step of monitoring an airbag sensor of the motor vehicle in order to determine the occupancy state of the seat associated with the sun visor system.

In the following description, there are shown and described several preferred embodiments of the sun visor system. As it should be realized, the sun visor system is capable of other, different embodiments and its several details are capable of modification in various, obvious aspects all without departing from the sun visor system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor system and together with the description serve to explain certain principles thereof. In the drawing figures.

Reference will now be made in detail to the present preferred embodiments of the sun visor system, examples of which are illustrated in the accompanying drawing figures.

DETAILED DESCRIPTION

Figure 1:
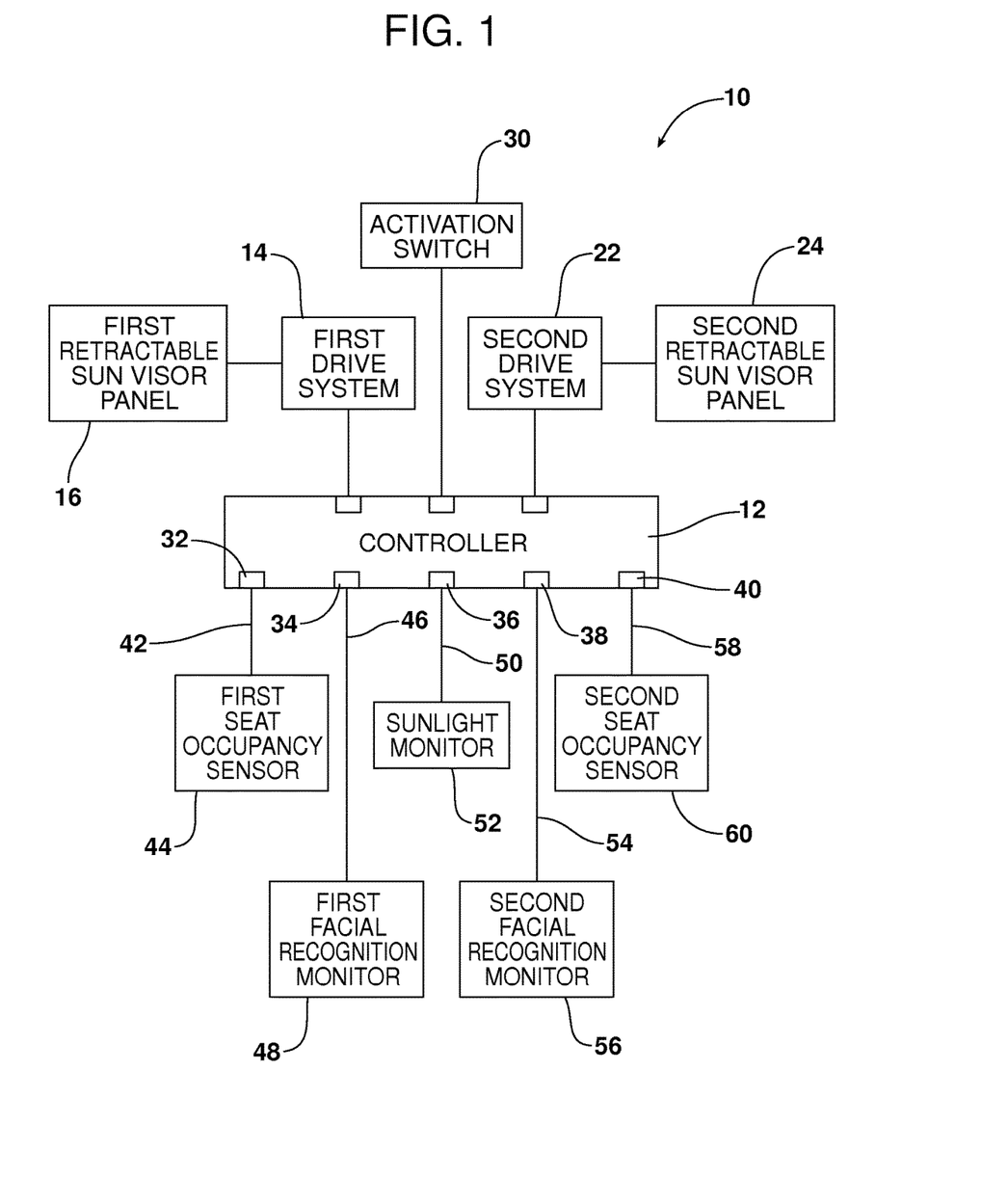
FIG. 1 is a schematic block diagram of the operating system of the sun visor system.

Reference is now made to FIGS. 1-6 illustrating the sun visor system 10 that is the subject matter of this document. As schematically illustrated in FIG. 1, the sun visor system 10 includes a controller 12 for controlling the overall operation of the system. The controller 12 comprises a computing device such as a dedicated microprocessor or electronic control unit (ECU) operating in accordance with appropriate software instructions. Thus, such a controller 12 may comprise one or more processors, one or more memories and one or more network interfaces which all communicate with each other over a communications bus.

Figure 2A:
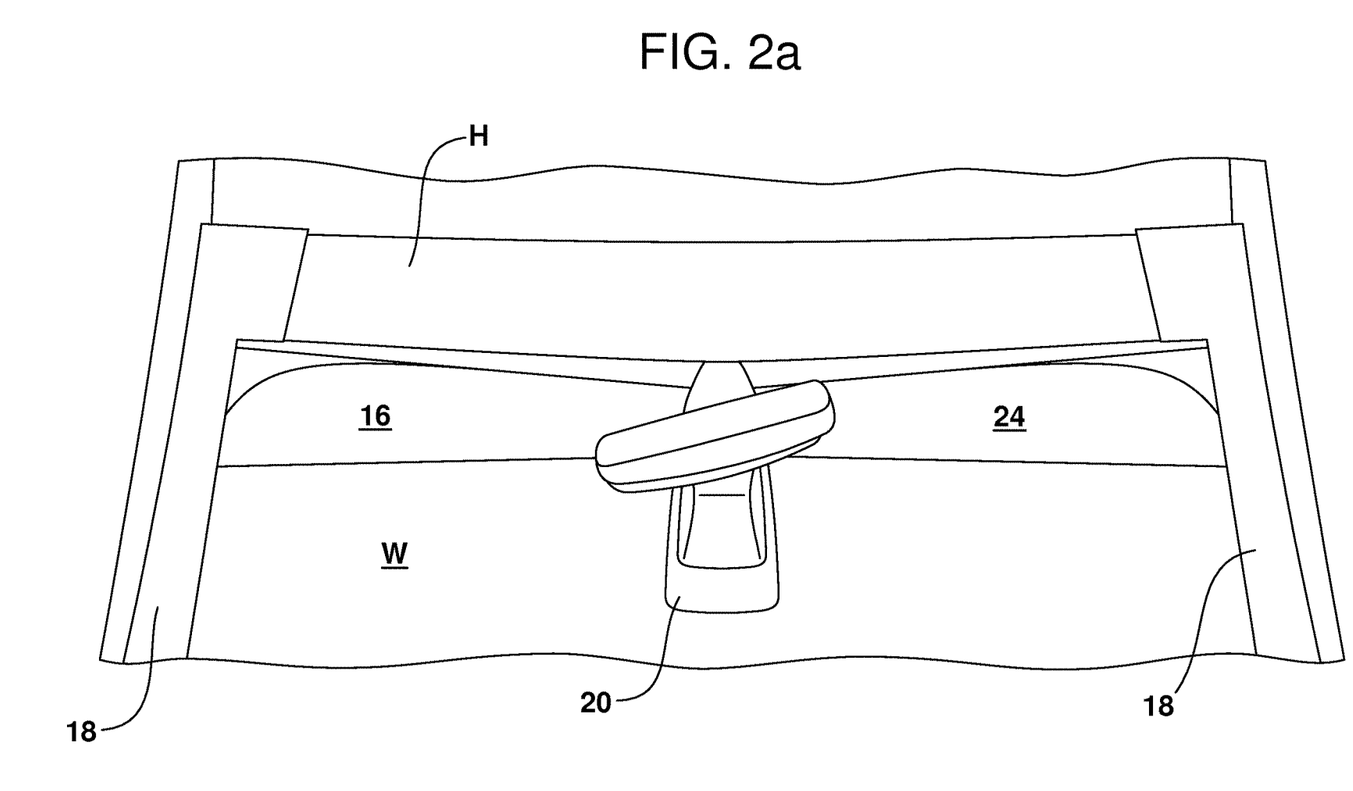
FIGS. 2a-2c are a series of schematic views from below illustrating the sun visor panels, respectively, in the stowed position within the headliner, an intermediate, partially-deployed position and a fully-deployed position.
Figure 2B:
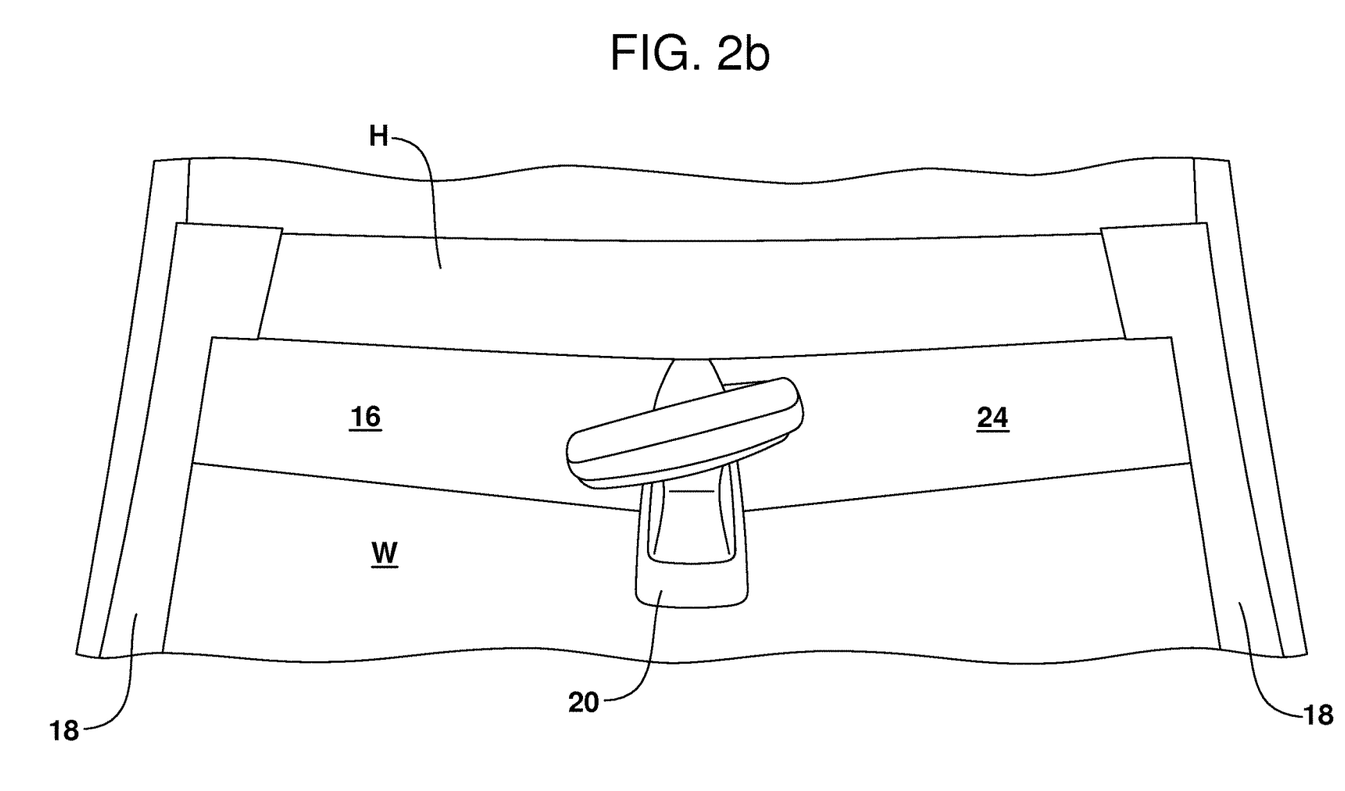
Figure 2C:
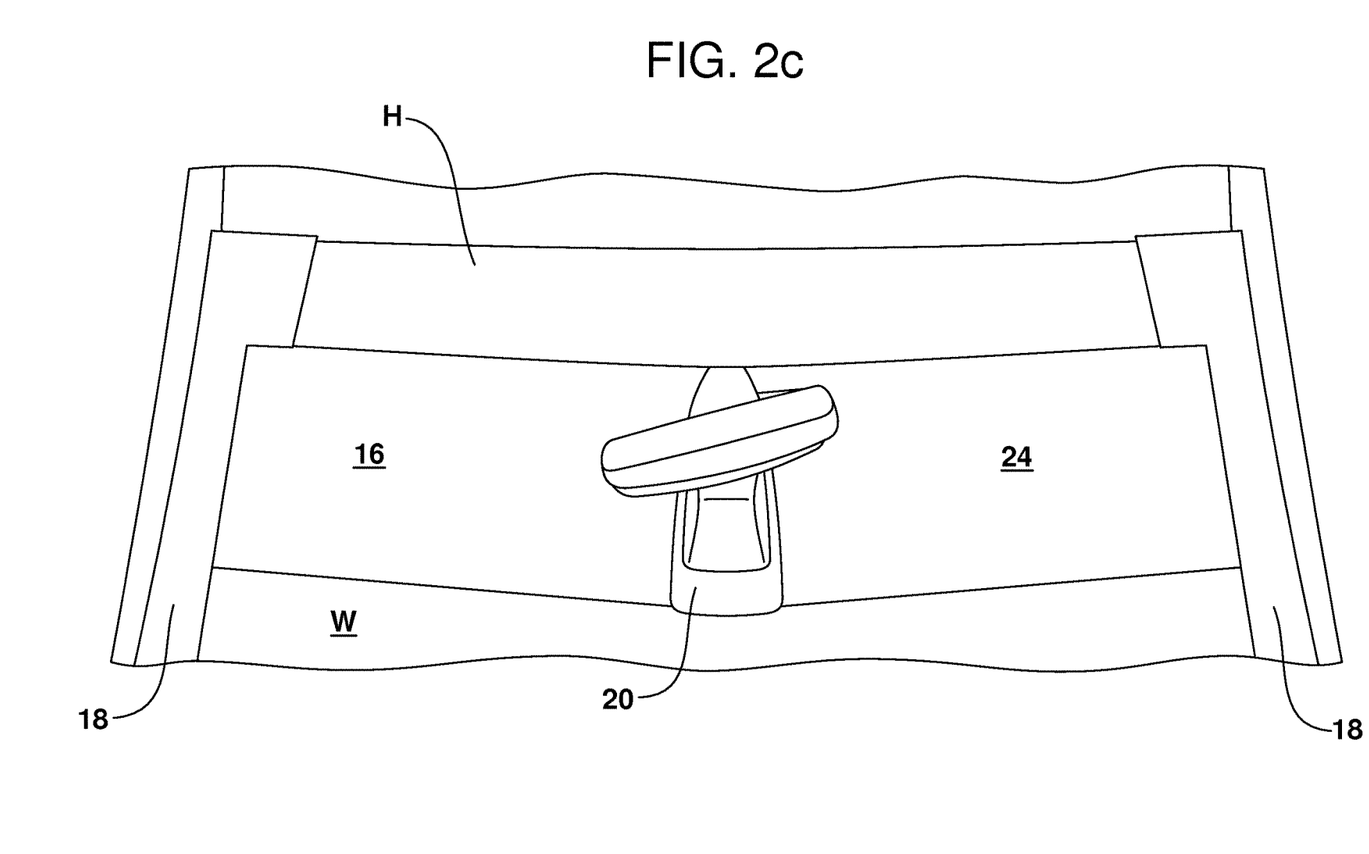

The controller 12 is connected to a first drive system 14 for driving a first retractable sun visor panel 16 between a stowed position wherein the sun visor panel is held within a recess between the headliner H and the roof of the motor vehicle (see FIG. 2a) and a fully-deployed position wherein the sun visor panel extends down over the top portion of the windshield W between an A-pillar 18 and a rearview mirror support 20 attached to a center portion of the windshield W (see FIG. 2c). As should be appreciated, the panel 16 may also assume substantially any intermediate position as illustrated in FIG. 2b.

As further illustrated in FIG. 1, the controller 12 is also operatively connected to a second drive system 22 for driving a second sun visor panel 24 between stowed and fully-deployed positions in a manner similar to the first panel 16. It should be appreciated that the first sun visor panel is provided between the A-pillar 18 on one side of the vehicle and the rearview mirror support 20 at the center while the second sun visor panel 24 is provided between the A-pillar 18 at the opposite side of the vehicle and the rearview mirror support 20 at the center of the windshield W.

The controller 12 may also include inputs 32, 34, 36, 38 and 40 connected to various other components. In the illustrated embodiment, the input 32 is connected via the control line 42 to a first seat occupancy sensor 44. The second input 34 is connected via the control line 46 to a first facial recognition monitor 48.

The input 36 is connected via control line 50 to an ambient sunlight monitor 52. The input 38 is connected via the control line 54 to a second facial recognition monitor 56. Finally, the input 40 is connected via the control line 58 to a second seat occupancy sensor 60.

The facial recognition monitors 48, 56 may comprise, for example, digital cameras or any other appropriate device for monitoring the faces of a driver and passenger of the motor vehicle and providing appropriate data to the controller 12 through the control lines 46, 54.

The seat occupancy sensors 44, 60 may comprise, for example, mass or pressure monitors provided in the front seats of the motor vehicle such as commonly associated with the airbag deployment system of a motor vehicle.

Figure 3:
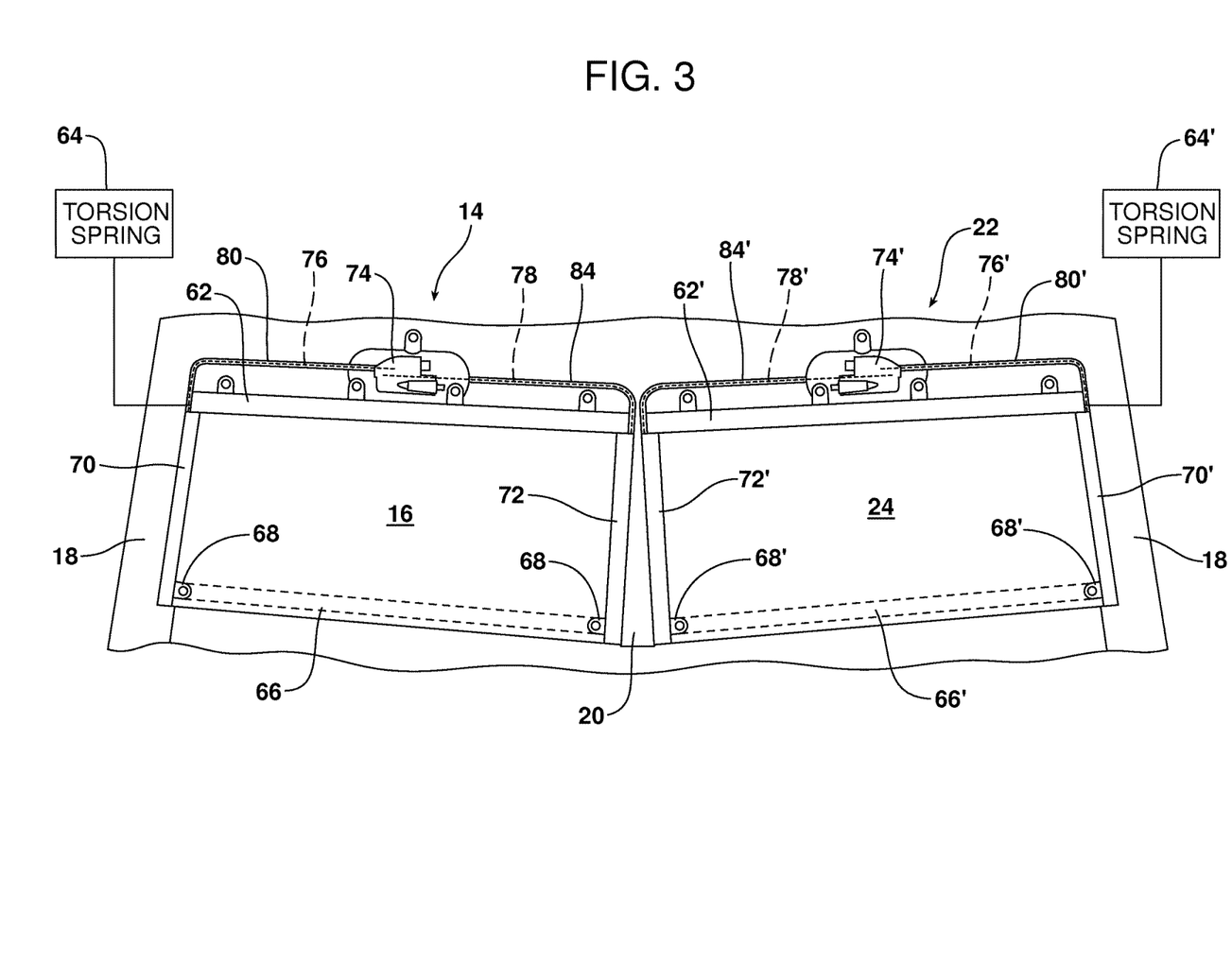
FIG. 3 is a schematic illustration of the sun visor system with the retractable sun visor panels on either side of the vehicle in a fully-deployed position across the windshield.

Reference is now made to FIG. 3. As illustrated, the first sun visor panel 16 comprises a flexible sheet of material that may be wound onto or unwound from a first roll 62. A torsion spring 64 may be operatively connected to the first roll 62 for biasing that roll and drawing the sun visor panel 16 toward a stowed position fully wound onto the roll.

Figure 4:
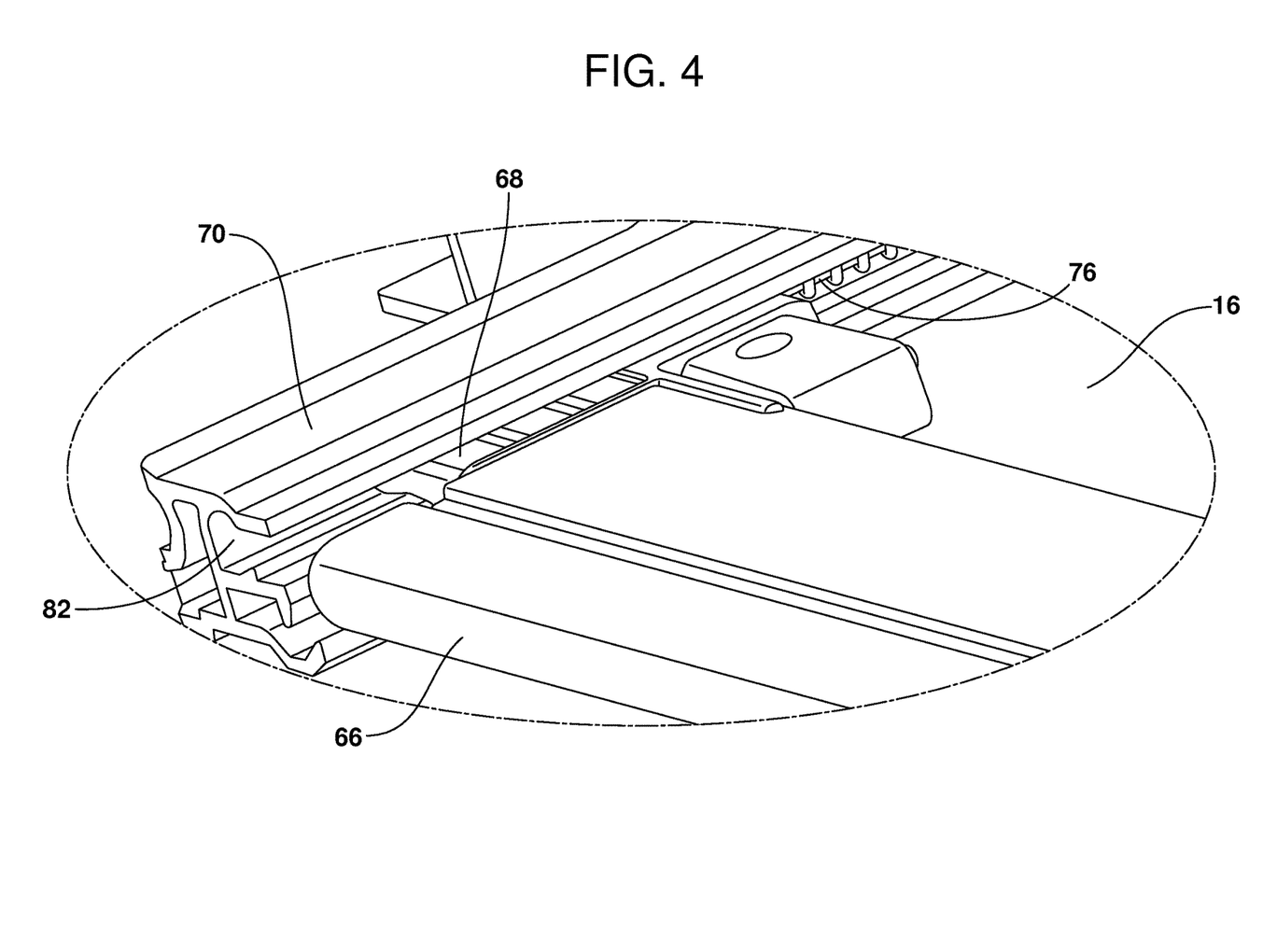
FIG. 4 is a detailed cross-sectional view illustrating how an end of a sun visor panel is received in the associated guide track and driven by means of a cable between stowed and fully deployed positions.

As best illustrated in FIG. 4, the distal margin of the sun visor panel 16 is wrapped around and secured to an elongated bar 66. The bar 66 is connected at each end to a coupler 68. The coupler 68 at a first end rides along a first guide track 70 carried on the A-pillar 18 while the coupler 68 at the second end rides along a second guide track 72 carried on the rearview mirror support 20.

Figure 5:
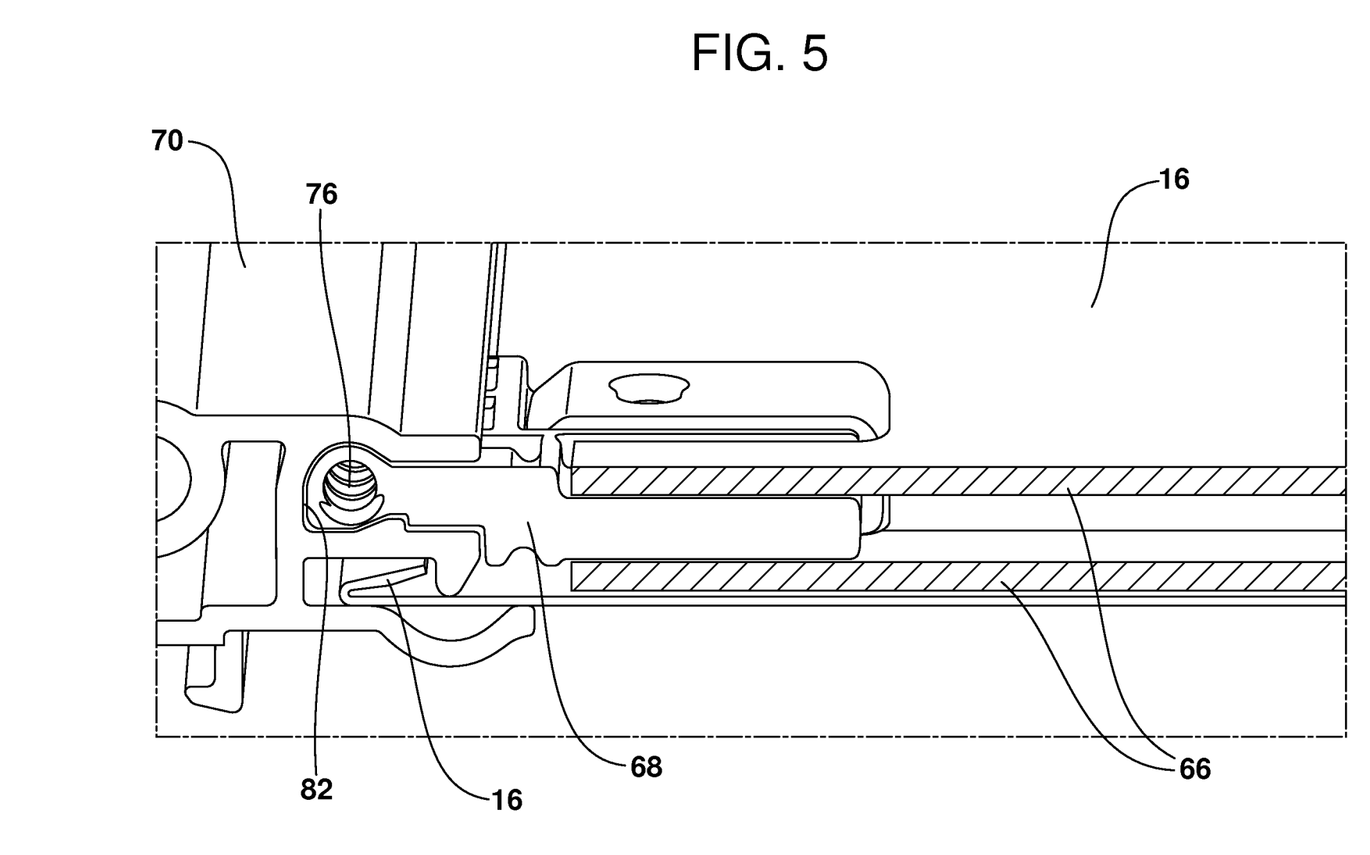
FIG. 5 is a perspective view of the same structures of the drive system illustrated in FIG. 4.

The first drive system 14 for displacing the sun visor panel 12 between the stowed and fully deployed positions includes a drive motor 74 and an associated linkage extending between the drive motor and the panel. That linkage comprises a first cable 76 connected to the coupler 68 at the first end of the bar 66 and a second cable 78 connected to the coupler 68 at the second end of the bar. The drive motor 74 includes a gear that interfaces with and drives the cables 76, 78.

As illustrated the first cable 76 extends through the lumen of a first support tube 80 between the motor 74 and the first guide track 70. The first cable 76 then extends through the guide channel 82 in the guide track 70. Both the lumen of the support tube 80 and the channel 82 of the guide track 70 are sized to allow free sliding movement of the relatively stiff cable 76 while preventing that cable from kinking as it is driven through the tube and guide channel by the motor 74.

The distal end of the cable 76 is connected to the coupler 68 that extends into the guide channel 82.

The second cable 78 extends through the lumen of a second support tube 84 between the motor 74 and the second guide track 72. That second cable 78 then extends through a second guide channel (not shown) in the second guide track 72 and the distal end of that cable 78 is connected to the coupler 68 that extends into that second guide channel. As should be appreciated, this construction, including the rigid support tubes 80, 84 and the first and second guide channels 82 between the motor and the two couplers 68 allow the cables 72, 76 to push and pull the first sun visor panel 16 between the stowed position illustrated in FIG. 2a and the fully-deployed position illustrated in FIG. 2c or selectively to any intermediate position therebetween such as illustrated in FIG. 2b.

The second drive system 22 for the second retractable sun visor panel 24 includes a similar structure and operates in the same manner to displace the second sun visor panel between the stowed and fully deployed positions. For brevity of description, those components are identified by identical reference numbers followed by prime sign (e.g. 70/70').

Figure 6:
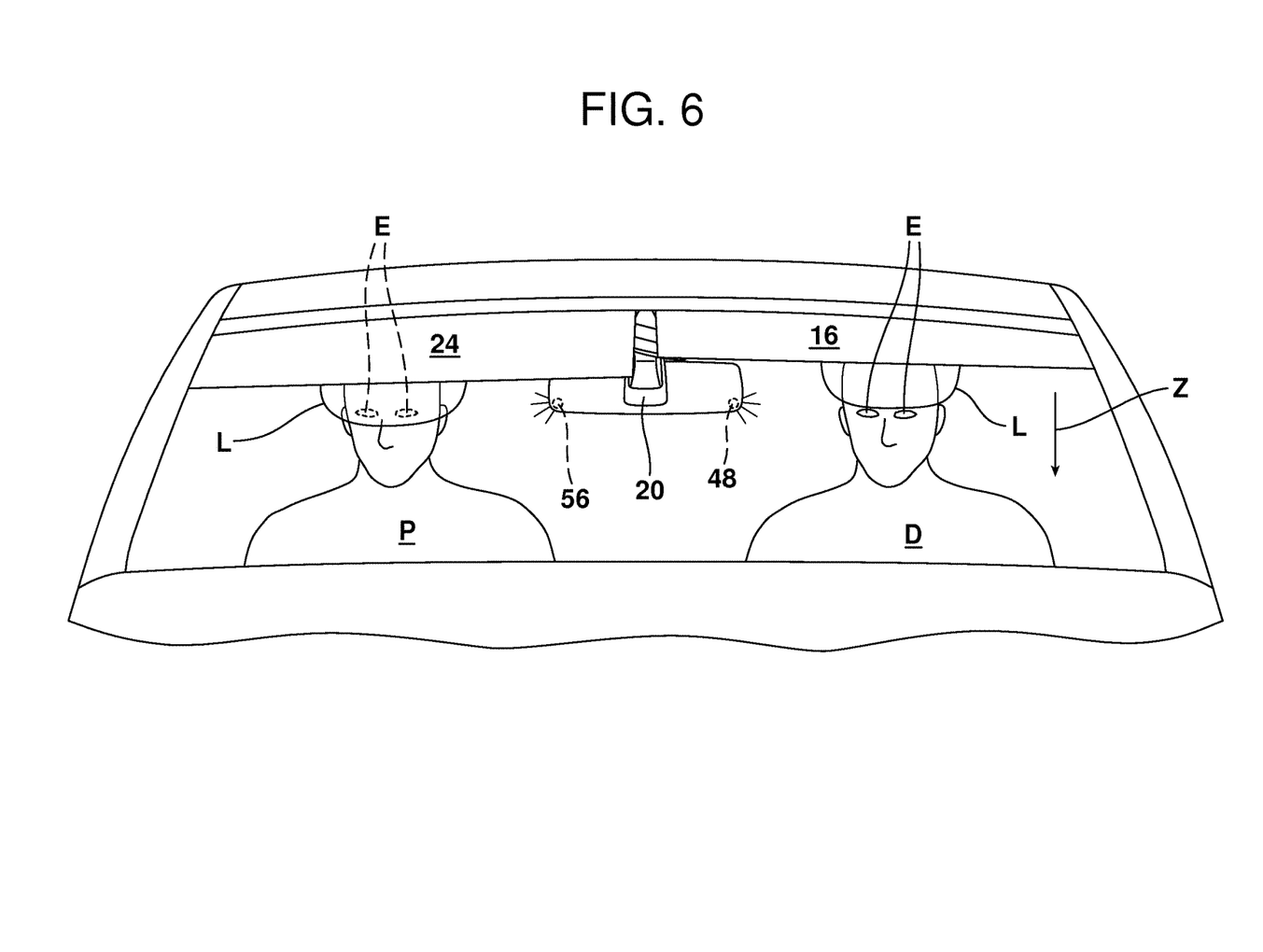
FIG. 6 is a front elevational view for illustrating the operation of the sun visor system.

Reference is now made to FIG. 6 illustrating how the two sun visor panels 16, 24 may be independently controlled by the controller 12 to meet the needs of the driver D and passenger P and prevent the sun's glare from entering their eyes E. As should be appreciated, the sun visor system 10 may be activated for operation by placing the activation switch 30 in the on position. When activated, the controller 12 periodically checks for inputs at the inputs 32, 34, 36, 38, 40. If data from the sunlight monitor 52 received at the input 36 indicates that the ambient sunlight exceeds a predetermined level, the sun visor system 10 remains active. Accordingly, the first facial recognition monitor 48 scans the face of the driver D while the second facial recognition monitor 56 scans the face of the passenger P.

The monitors 48, 56 are specifically configured to identify the eyes E of the driver D and passenger P and the sun visor panel cast shadow line L across the face of the driver D and passenger P. Data regarding the eyes E and cast shadow line L for both the driver D and passenger P are provided to the controller 12 from the facial recognition monitors 48, 56. In response to that data, the controller 12 provides operating instructions to the first and second drive systems 14, 22 to adjust the relative position of the first retractable sun visor panel 16 to maintain the cast shadow line L below the eyes E of the driver D and the second drive system 22 to adjust the position of the second panel 24 to maintain the cast shadow line L below the eyes E of the passenger P.

In the illustrated embodiment, the facial recognition monitor 56 detects the cast shadow line L below the eyes E of the passenger P and no adjustment is made to the second visor panel 24. In contrast, the facial recognition monitor 48 detects the cast shadow line L above the eyes E of the driver D. As a result, the controller 12 directs the motor 74 to displace the first visor panel downwardly in the direction of action arrow Z until the cast shadow line L covers the driver's eyes E.

As should be appreciated, adjustments may be made continuously or at predetermined intervals so that the visor panels 16, 24 are automatically deployed as necessary to maintain the cast shadow lines L below the eyes E of the driver D and passenger P depending on the location of the sun, the attitude of the motor vehicle relative to the sun, the driver and passenger seat positions and the driver's and passenger's movements. Automatic adjustment provides quicker response times thereby minimizing if not eliminating the sun's glare from reaching the eyes of the driver D or passenger P and accomplishes this benefit with less distractions to the driver.

Since the first sun visor panel 16 extends completely across the upper portion of the windshield between the A-pillar 18 and the rearview mirror support 20, there are no gaps at the end of the visor that could potentially allow the passage of the sun's glare to reach the eyes of the driver D. A similar benefit is provided to the passenger P by the second panel 24 which also extends fully across the upper portion of the windshield between the A-pillar 18 and the rearview mirror support 20.

It should also be appreciated that the panels 16, 24 of a flexible sheet material are relatively thin as are the bars 66 and the control cables 76, 78, 76', 78'. Accordingly, the sun visor system 10 may be easily packaged at the headliner H in a minimum amount of space so as to not impinge upon headroom or windshield surface area.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A sun visor system for a motor vehicle, comprising:
a first guide track carried on an A-pillar;
a second guide track carried on a rearview mirror support;
a retractable sun visor panel having a first end received in said first guide track and a second end received in said second guide track wherein said retractable sun visor panel is displaceable between a stowed position and a fully deployed position; and
a controller and a drive system responsive to said controller to displace said retractable sun visor panel between said stowed position and said fully deployed position, wherein said drive system includes a motor and a linkage between said motor and said retractable sun visor panel, and wherein said linkage includes a first cable connected to said first end of said retractable sun visor panel and a second cable connected to said second end of said retractable sun visor panel.

2. The sun visor system of claim 1, further including a first tube, extending between said motor and said first guide track, for receiving said first cable and a second tube, extending between said motor and said second guide track, for receiving said second cable.

3. The sun visor system of claim 1, wherein said controller is configured to receive data from a seat occupancy sensor indicating presence of an individual in a seat of said motor vehicle associated with said retractable sun visor panel.

4. The sun visor system of claim 3, wherein said seat occupancy sensor is a mass sensor associated with an air bag deployment system of the motor vehicle.

5. The sun visor system of claim 3, wherein said controller is configured to receive data from a sun detection sensor for indicating ambient sunlight and activating said sun visor system when said sunlight exceeds a predetermined threshold level.

6. The sun visor system of claim 1, further including a monitor for detecting sunlight on a face of an occupant of said seat.

7. The sun visor system of claim 6, wherein said monitor is a camera.

8. The sun visor system of claim 1, wherein said retractable sun visor panel comprises a flexible sheet of material wound on a roll.

9. The sun visor system of claim 8, further including a spring for biasing said roll and drawing said retractable sun visor panel toward said stowed position.

10. The sun visor system of claim 1, further including an activation switch for said sun visor system.

11. A sun visor system for a motor vehicle, comprising:
a retractable sun visor panel;
a controller;
a drive system responsive to said controller to displace said retractable sun visor panel between a stowed position and a fully deployed position; and
a seat occupancy sensor for indicating presence of an individual in a seat of said motor vehicle associated with said retractable sun visor panel, wherein said seat occupancy sensor is a mass sensor associated with an air bag deployment system of the motor vehicle.

12. The sun visor system of claim 11, further including a monitor for detecting sunlight on a face of an occupant of said seat, said controller being configured to be responsive to said monitor and adjust an operation position of said retractable sun visor panel so as to maintain a sun visor panel cast shadow line below eyes of said operator.

13. The sun visor system of claim 12, wherein said monitor is a camera.

14. The sun visor system of claim 13, wherein said controller is configured to receive data from a sun detection sensor for indicating ambient sunlight and activating said sun visor system when said sunlight exceeds a predetermined threshold level.

15. A method of providing sun visor coverage for a windshield of a motor vehicle having a sun visor system, comprising:
providing a first guide track carried on an A-pillar of said motor vehicle;
providing a second guide track carried on a rear view mirror support;
providing a retractable sun visor panel extending between said first guide track and said second guide track; and
monitoring an air bag sensor of the motor vehicle to determine occupancy of a seat associated with said sun visor system.

16. A method of claim 15, including:
monitoring a face of a motor vehicle seat occupant; and
displacing said retractable sun visor panel between a stowed position and a fully deployed position so as to maintain a sun visor panel cast shadow line below eyes of said operator.

* * * * *